United States Patent [19]

Heyraud et al.

[11] Patent Number: 4,684,860

[45] Date of Patent: Aug. 4, 1987

[54] ELECTRIC MOTOR DRIVE EQUIPPED WITH A PERMANENTLY MAGNETIZED ROTOR

[75] Inventors: Marc A. Heyraud; Jean-Bernard Kureth, both of La Chaux-de-Fonds, Switzerland

[73] Assignee: Asgalium S.A., Switzerland

[21] Appl. No.: 824,546

[22] Filed: Jan. 23, 1986

[30] Foreign Application Priority Data

Jan. 29, 1985 [EP] European Pat. Off. ........ 85810030.8

[51] Int. Cl.$^4$ .............................................. H02P 8/00
[52] U.S. Cl. .................................... 318/696; 318/685
[58] Field of Search ............... 318/138, 254, 696, 685

[56] References Cited

U.S. PATENT DOCUMENTS

| | | | |
|---|---|---|---|
| 3,940,677 | 2/1976 | Morino et al. | 318/685 |
| 4,376,262 | 3/1983 | Okuda et al. | 318/696 |
| 4,415,844 | 11/1983 | Mendenhall et al. | |
| 4,591,774 | 5/1986 | Ferris et al. | 318/696 |

Primary Examiner—William M. Shoop, Jr.
Assistant Examiner—Saul M. Bergmann
Attorney, Agent, or Firm—Parkhurst & Oliff

[57] ABSTRACT

The motor (9) comprises a motor winding with two phases (2, 3). Sensor c detects the orientation of the permanently magnetized rotor. Selector (S) controlled by line (s) which can be connected to a memory (M) selects the sending to circuit (C) of clock pulses (H) or signals (G) coming from circuits (F) which receives the pulses emitted by sensor (c). In circuit (C) the signals received from the selector are processed and shaped into control signals which act in the power stage of circuit (P) upon each of the two phases (2, 3) by triggering and releasing them alternately in such a way as to ensure that the operation of the rotor occurs either in step mode, under the influence of the clock signals (H), or in direct current mode, i.e., as a function of the momentary position of the rotor as it is detected by sensor (c).

6 Claims, 7 Drawing Figures

ELECTRIC MOTOR DRIVE EQUIPPED WITH A PERMANENTLY MAGNETIZED ROTOR

BACKGROUND AND SUMMARY OF THE INVENTION

As a rule, servomotors include a permanently magnetized rotor. Two main categories of this type of motor are known, i.e.,:
dc motors
stepping motors.

In general, dc motors can be characterized by the fact that current switching is assured within the motor in such a way that the position of the rotor is at an optimum. More often than not, one strives to use solely one phase when the position of the rotor permits a high torque constant (i.e., when the torque obtained per unit of current is at a maximum). When the relative rotor-stator movement results in a reduction of the torque constant of the switched-on phase and another phase would be more efficient, the current is switched into this phase. In the case of a conventional dc motor, the collector causes the switching dependent upon the position of the rotor. In the case of a dc motor with a rotating magnet (without collector), the switching is controlled, for example, by the signals coming from a pair of Hall probes that "pick up" the position of the rotor magnet by measuring its magnetic field.

For a stepping motor, on the other hand, a sequence of switching is not "automatically" picked up by internal components of the motor. It is a logic control external to the motor that dictated the choice of the phase carrying the current, as well as the switching rhythm. Therefore, it can be said that this switching is a switching over time as opposed to a switching according to the angular position of the rotor. The advantages of the stepping motor are in particular:
"digital" open-loop behaviour: one fixed mechanical movement corresponds to one control pulse;
positional errors are not cumulative.

U.K. Published Patent application No. 2,092,780 (corresponding to U.S. Pat. No. 4,415,844) describes a drive system for a motor without a collector, comprising Hall probes and a processor capable of processing signals of the probes in such a way that the motor rotates at a predetermined speed.

The disclosure of U.S. Pat. No. 4,376,262 describes a motor whose basic operation is of the stepping type, the pulse frequency being given by an external frequency source, but whose drive circuit comprises a speed detector and means of temporarily assuring an operation at a speed that varies continuously as it approaches the set speed, if the detector detects a variation in the effective speed in relation to the set speed.

However, it has been found that there was a need for a device capable of driving a power take-off shaft according to one's desire, either in a manner similar to that of a dc motor, or in a manner similar to that of a stepping motor.

To accomplish this, the disclosure of U.S. Pat. No. 3,940,677 proposes an arrangement in which a stepping motor and a dc motor without collector are coupled to the same shaft.

The present invention has as its object the provision of a simpler arrangement that takes up less space and is more efficient that the arrangement known from the prior art.

The aim of the invention is thus to provide a simple and compact automatic control device easy to join to a motor which will enable it to be operated alternately as a direct current motor or as a step motor, the two operating modes able to succeed each other without any intermediate stoppage of the motor.

To that end, the object of the present invention is a drive device for an electric motor of which the stator and rotor include for one of them a motor winding of one or several phases and for the other of them a permanently magnetized magnetic element, with one or several pairs of poles. The device comprises a clock signal generator, an orientation signal generator indicating the orientation of the rotor at successive instants, control means capable of controlling the triggering and release of the phase or phases of the winding, in a first mode of operation as a function of the clock signals, and in a second mode of operation as a function of the orientation signals, and the selection means making it possible to put into operation one of the operating modes.

BRIEF DESCRIPTION OF THE DRAWINGS

An embodiment of the invention will be described hereinafter, as an example, referring to the annexed drawings, of which.

DETAILED DESCRIPTION OF THE PREFERRED EMBODIMENTS

Figure 1:
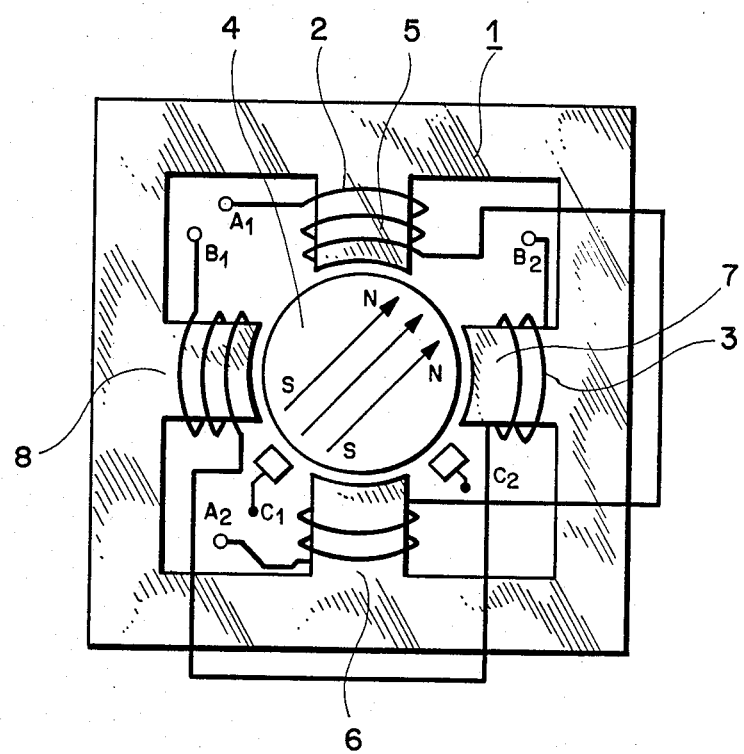
FIG. 1 is a schematic view representing the motor.

Motors using a permanently magnetized rotor are known as such. Schematically, a motor of this type includes as seen in FIG. 1 a magnetic circuit 1, motor windings 2 and 3, and a permanently magnetized rotor 4. In the diagram shown in FIG. 1, rotor 4 has diametral magnetization creating a pair of N-S magnetic poles. The two motor windings 2 and 3 are wound on opposite polar elements 5, 6, 7, 8. Winding 2 comprises an input terminal $A_1$ and an output terminal $A_2$, while winding 3 comprises an input terminal $B_1$ and an output terminal $B_2$. The current pulses must be sent successively in windings 2 and 3 in such a way that the motor operates as a two phase motor. If the sequence of succession of the pulses and their length are controlled by a device outside the motor with a predetermined frequency and in such a way that between each pulse the rotor stops in one of two positions determined by the pairs of polar elements 3, 6 and 7, 8, then that is operation as a step motor. If, however, the pulses are controlled as a function of the orientation of the magnetized field of the rotor, then the movement of the rotor is self-regulated and that is operation as a direct current motor. In the diagram in FIG. 1, $c_1$ and $c_2$ are two sensors (c) whose roll will be explained below and which make it possible for certain embodiments of the device to provide self-regulated operation of rotor 4.

In step mode operation, the frequency of the pulses can be increased to a point where the movement of the rotor is practically continuous. That then is quasi-synchronous operation, but it is known that such a motor cannot be brought reliably to a speed as high as can be reached with a direct current motor whose rotor has the same inertia, the same inductance, and the same number of poles.

However, it is known that one of the advantages of operation as a step motor is that, in each of the stopped positions of the rotor, the rotor is locked by retention torque which comes in an embodiment like that shown in FIG. 1 from the correlation between the effects of the magnetized field of the rotor and the salient polar elements 7, 8, 5, 6. Even in the presence of external load torque, the motor remains locked.

Although FIG. 1 shows a two phase motor with one pair of poles, it is intended that the device which will be described can be constructed in such a way as to apply to motors with any number of phases and pairs of poles, including motors with a single magnetic pole.

Figure 2:
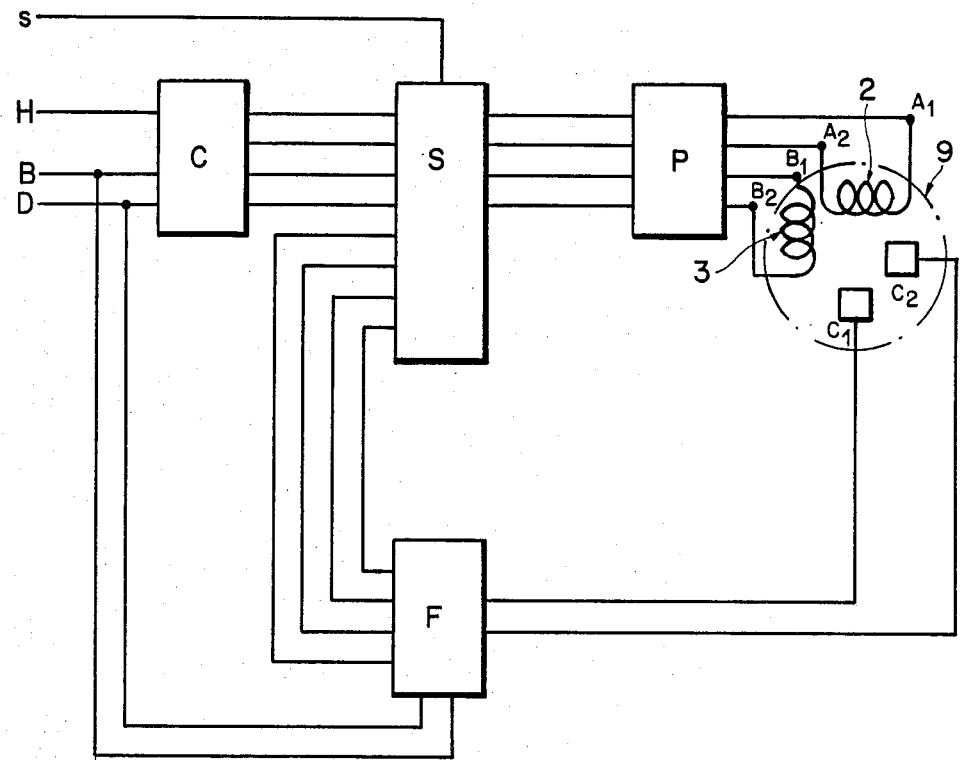
FIG. 2 is a block diagram of a first embodiment of the drive device.

In FIG. 2, the motor is represented schematically and designated by number 9. The input connections $A_1$, $A_2$, $B_1$ and $B_2$ of windings 2 and 3 are connected to output terminals of a circuit P which is a power circuit providing the interface between the conductors of relatively high voltage capable of supplying the two phases 2 and 3 of the motor with currents of acceptable intensity and voltage, and the input conductors intended to convey the control signals which essentially provide the triggering and release of the phases on windings 2 and 3. The input conductors of circuit P are connected to the output of a circuit S which is a selector. This selector is controlled by an input line S. On its input side, the selector is connected both to conductors coming from a circuit C and to conductors coming from a circuit F. In the embodiment described, circuit C is a control circuit. At its input, the circuit C receives by means of a conductor H clock signals which have the required frequency to control motor 9 when it is operating as a step motor. Another input line B makes it possible to ensure the triggering and release of the motor, while a third input line D makes it possible to control the direction of rotation of the motor and thus acts on the order in which the two phases 2 and 3 are supplied.

Circuit F is a ahaping circuit for the control signals. At its input it receives signals emitted by the two sensors $c_1$ and $c_2$. These sensors are as a rule Hall probes which are sensitive to the magnetic field of the rotor at the location where they are placed and which send toward circuit F signals indicating the instant when one of the N or S poles of the rotor passes opposite one of the probes. Circuit F is disposed in such a way as to shape these signals. When guiding line s polarizes circuit s in such a way that the input lines coming from circuit F conduct the signals directly to circuit P, these signals are able to guide the high power part of circuit P. It will be seen that the locking and direction control lines are also connected to circuit F.

Thus, the arrangement described makes it possible to operate motor 9 at will as a step motor or as a direct current motor. To do so, the logical level of line s need only be adjusted accordingly. During operation as a step motor, the frequency of the pulses is given directly by the frequency of the clock signals coming from line H, whereas during direct current operation it is the signals of sensors $c_1$, $c_2$ which, shaped in circuit F, provide triggering and release of phases 2 and 3.

Figure 3:
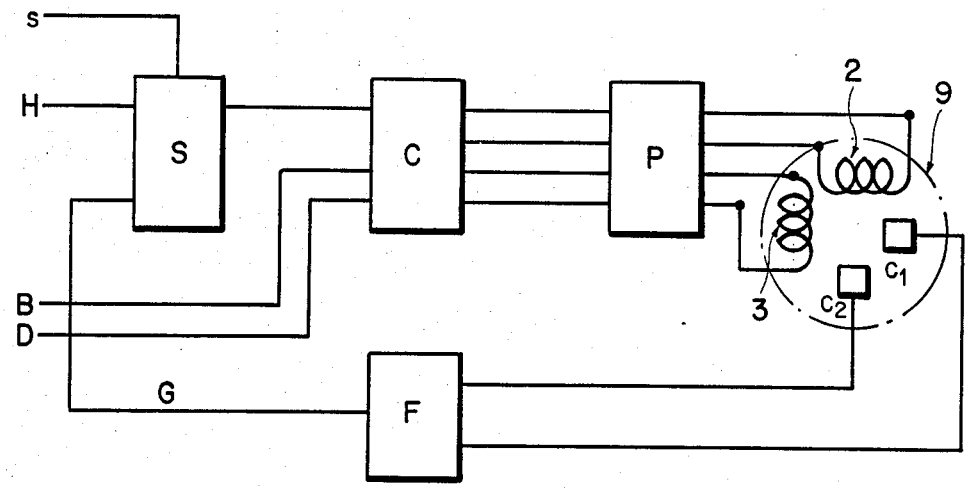
FIG. 3 is a block diagram representing a second embodiment of the device in accordance with the invention.

FIG. 3 represents a variation of the arrangement of the control device operating on the basis of a motor 9 which is indentical to the one described herein and which comprises particularly the two Hall sensors $c_1$ and $c_2$. In this variation, the clock signals H and the signals emitted by circuit F are processed in the same way. In this case circuit F will be different from the one in FIG. 2 in that the control signals coming from the two sensors $c_1$, $c_2$ will be transmitted as control signals without having been previously shaped. The shaping of impulses able to guide power circuit P will be done for both the clock signals H and the signals emitted by circuit F in control circuit C. That is why a line G connects the output of circuit F with an input of circuit S parallel to the input line of the clock signals H. According to whether the selector circuit is polarized for operation as a step motor or as a direct current motor, signals H or G will be transmitted to circuit C into which also come the signals determining the direction of rotation of the motor and its triggering or release.

Figure 5:
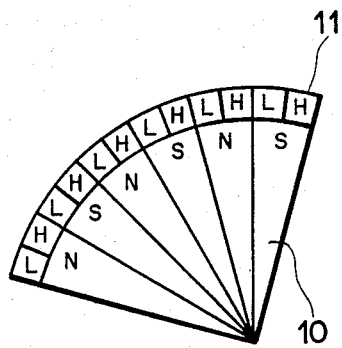
FIG. 5 is a partial and schematic view representing a part of the permanently magnetized rotor of the motor referred to in the diagram of FIG. 4.
Figure 4:
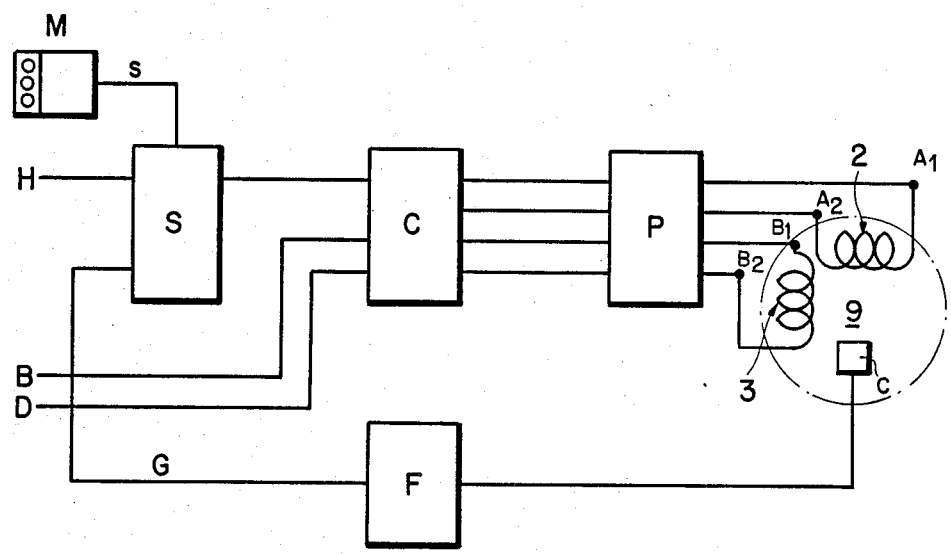
FIG. 4 is a block diagram of a third embodiment of the invention.

FIG. 4 shows another embodiment of the control device. Here, too, circuit F emits in line G signals which are processed parallel to the clock signals H in the selector circuit S, and H signals or the G signals being transmitted to control circuit C according to the polarization of selector input s. However, in this embodiment of the device, a simplification has been introduced in that there remains only a single sensor c instead of the two sensors $c_1$ and $c_2$ in the proceeding embodiments. In this case, to permit direct current operation, sensor c must be able to indicate all of the instances of triggering of any of the phases as a function of the momentary orientation of the rotor. To do so, a practical solution consists of disposing the rotor of the motor as shown schematically in FIG. 5. This figure refers to the case of a permanently magnetized rotor in the form of a disc in which the pairs of poles define the magnetic axes which are parallel to the axis of the rotor and which are distributed around that axis. In addition, as seen on the basis of FIG. 5, this case concerns a rotor with a very high number of pairs of poles, in this case 24 pairs of poles. In addition, the motor winding has two phases. Thus, it is necessary to distinguish opposite each pair of poles the instant of switching of each of the two phases. That is why on the periphery of the rotor disc, a portion of which is shown as 10 in FIG. 5, there is an auxiliary polarization region numbered 11 which forms a crown on the periphery of the disc. In that region, auxiliary polar zones amounting to two polar zones per pair of poles are defined because of magnetization caused by overcharge on the periphery of the rotor. With an arrangement of this type, it is sufficient to use as sensor c a single Hall probe and it will transmit to line G the control signals which will have been formed in circuit F as a function of the signals emitted by that probe. Without any complication for the circuit the presence of a probe in the contruction of the device can thus be avoided, which permits a significant reduction in the cost price of the device.

Figure 6:
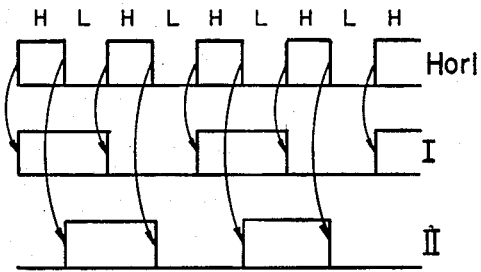
FIG. 6 is a schematic diagram explaining the operation of the device illustrated in FIG. 4 acting as a direct current motor.

The functions carried out in circuit C in direct current operating mode are represented schematically in FIG. 6. The signals transmitted from circuit S to circuit C by line G function as if in the case of clock signals (upper line of the diagram) and it is seen that passage from the low logical level to the high logical level has the effect each time of alternately triggering or releasing one of the phases, whereas conversely, passing from high logical level to low logical level triggers or releases alternately the other phase. In the case of a motor with more than two phases, it is intended that the principal polar zone of the rotor should be characterized by a number of divisions greater than two. In fact, the number of divisions could be a multiple of the number of phases, but in practice, the most effective solution is generally to choose for these subdivisions a number of auxiliary zones equal to the number of phases for each principal polar zone.

The fact must be stressed once again that in cases where the arrangement of auxiliary polar zones on the rotor would cause complication and difficulty nothing prevents using, with a device such as the one described here, means for the detection of rotor orientation other than Hall probes and the magnetic fields used in the examples described above. Thus, in the case of a device in accordance with FIG. 4, the single sensor c could be a sensor of any type able to operate with any identification marking with which the rotor is provided. Thus sensor c can for example be an optic sensr operating with holes or slots distributed on the periphery of the rotor, the rotor being lit on its side opposite the sensor by means of a lamp. Instead of holes or slots, reflecting zones could also be used to operate with an optic sensor. There could also be used a capacitive sensor operating for example with protuberances distributed on the periphery of the rotor, or an inductive sensor. There might even be used mechanical sensors in the form of a switch that would be operated by the protuberances acting as cams on the periphery of the rotor.

Figure 7:
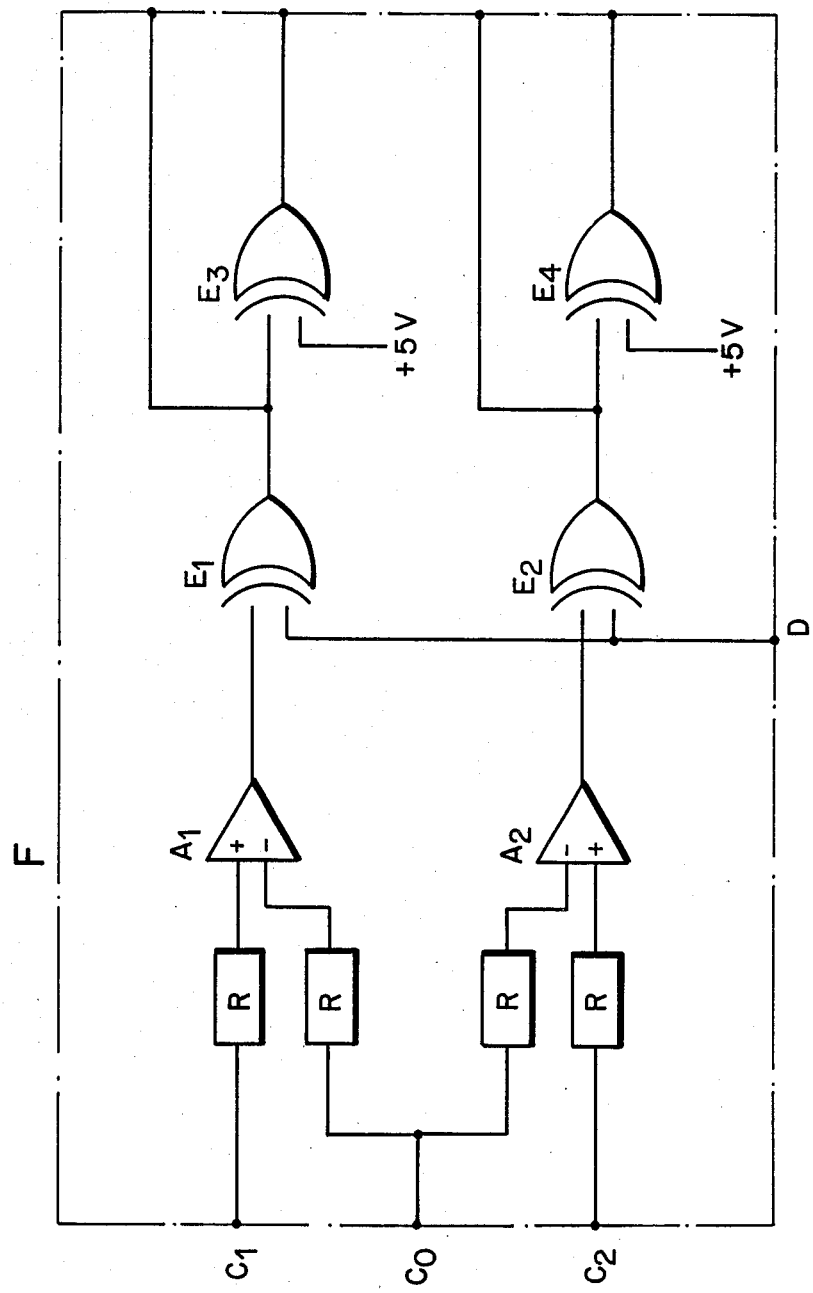
FIG. 7 is a more detailed diagram showing the electronic components used in one of the blocks shown in FIG. 2.

The set of circuit components described in relation to FIGS. 2, 3 and 4 can be made from standard components found commerically. Thus, FIG. 7 shows in another example of the embodiment how circuit F can be constituted. That Figure shows the input connections $c_1$, $c_2$ and $c_3$ which are connected respectively to sensor $c_1$, to sensor $c_2$, as well as to a point common to the two sensors. These input connections are linked by means of resistors R for example of 10 K to two amplifiers $A_1$ and $A_2$, the outputs of which are connected to one of the inputs of two OR exclusive gates $E_1$ and $E_2$. The output connections of circuit F are connected to both the output of each of the two gates $E_1$ and $E_2$, and to the output of two additional OR exclusive gates $E_1$ and $E_2$. The second inputs of the two gates $E_1$ and $E_2$ are connected jointly to an input terminal D which conveys the signal determining the direction of rotation of the motor. It will be seen that this is a very simple embodiment making it possible to operated circuit F in the case of the diagram shown in FIG. 2. As for circuits S, C, and P as well, components can be found commerically that will provide the required functions. Thus particularly circuit L 298 from the SGS Company can be used in the device described as circuit P to bring a 50 V motor up to a current on the order of 2 to 3 A. In addition, although heretofore a circuit able to be constructed as an integrated circuit has never been given the functions described above in relation to block C, particularly in the embodiments of FIGS. 3 and 4, it was found that some circuits available commerically made it possible to fulfill these functions. Thus the circuit marketed by the SGS Company and designated as L 297 can be used as circuit C to fulfill the functions described above.

In the diagram of FIG. 4, block M represents a programming control able to vary the logical level of the selection line s as a function of time according to a program provided in advance and stored in circuit M. That program can be controlled for example by means of keys, according to requirements. In this way it is possible to pass automatically from direct current operating mode to step motor operating mode and vice versa without intermediary stoppage of the motor. That possibility significantly improves the scope of use of a motor and, particularly in the case of a machine tool for example, to pass from one operating mode to another during a single movement of mobile equipment such as a cutter stand or a work piece slide. For example, during a movement from one specific position to another specific position, the device can operate first in step mode, in which case the starting position is maintained with a retention torque which can be significant, after which it shifts to direct current mode which permits a high speed of movement, then to return to the step operating mode at the end of the movement in such a way that the finishing position is also determined by the retention torque of the motor. It would also be possible with additional logical circuits to work in half step and/or cut current control.

Although motors have been described above in which the winding is integral with the stator and the permanent magnet with the rotor, the inverse arrangement is also possible.

We claim:

1. An electric motor circuit comprising:
   a stator part and a rotor part, one of said stator part and rotor part having a motor winding of at least one phase, the other of said stator part and rotor part having a permanently magnetized magnetic element with at least one pair of magnetic poles;
   a drive device comprising:
      clock signal generating means;
      orientation signal generating means for indicating the orientation of said rotor part at successive instants, said orientation signal generating means comprising at least one sensor having a predetermined location fixed relative to said winding and being sensitive to variations of a magnetic field generated by said magnetic element at said location;
      control means, connected to said clock signal generating means and said orientation signal generating means, for selectively controlling the energization and deenergization of said at least one phase of said winding in a first and a second operating mode, wherein in said first operating mode said at least one phase is periodically energized and deenergized in response to successive clock signals from said clock signal generating means, and in said second mode said at least one phase is energized and deenergized in response to successive orientation signal from said orientation signal generating means, said control means further comprising means for processing signals emitted by said at least one sensor and for forming control signals for energizing and deenergizing said at least one phase of said winding whereby said rotor part turns at a substantially constant speed; and
      selection means, having a control input, for selectively activating one of said first and second operating modes;
   wherein the rotor part is a permanently magnetized rotor comprising a principal region divided into polar zones distributed around an axis of the rotor in pairs of zones of opposite polarity, and an auxiliary region comprising a number of auxiliary polar zones said number being a multiple of that of the principal polar zones, a predetermined number of auxiliary polar zones being allotted to each main polar zone, and wherein the orientation signal generating means being disposed in such a way as to cooperate with the said auxiliary polar zones.

2. The circuit in accordance with claim 1, wherein the number of auxiliary polar zones associated with each principal polar zone is equal to the number of phases of the winding.

3. The circuit in accordance with claim 1, wherein in the orientation signal generating means comprises a single sensor placed in such a way as to react to the variations of said magnetic field due to the passage of the auxiliary polar zones, and wherein the means for processing forms the control signals on the basis of the orientation signals and of data concerning the number of phases and poles.

4. The circuit in accordance with claim 2, wherein the orientation signal generating means comprises a single sensor placed in such a way as to react to the variations of said magnetic field due to the passage of the auxiliary polar zones and wherein the means for processing forms the control signals on the basis of the orientation signals and of data concerning the number of phases and poles.

5. An electric motor circuit comprising:
 a stator part and a rotor part, one of said stator part and rotor part having a motor winding of at least one phase, the other of said stator part and rotor part having a permently magnetized magnetic element with at least one pair of magnetic poles;
 a drive device comprising:
  clock signal generating means;
  orientation signal generating means for indicating the orientation of said rotor part at successive instants;
  control means, connected to said clock signal generating means and said orientation signal generating means, for selectively controlling the energization and deenergization of said at least one phase of said winding in a first and a second operating mode, wherein in said first operating mode said at least one phase is periodically energized and deenergized in response to successive clock signals from said clock signal generating means, and in said second mode said at least one phase is energized and deenergized in response to successive orientation signals from said orientation signal generating means; and
  selection means, having a control input, for selectively activating one of said first and second operating modes.

6. The circuit as recited in claim 5 wherein said orientation signal generating means comprises at least one sensor having a predetermined location fixed relative to said winding and being sensitive to variation of a magnetic field generated by said magnetic element at said location; and
 wherein said control means further comprises means for processing signals emitted by said at least one sensor and for forming control signals for energizing and deenergizing said at least one phase of said winding whereby said rotor part turns at a substantially constant speed.

* * * * *